United States Patent
Hopper (10) Patent No.: US 7,143,855 B2
(45) Date of Patent: Dec. 5, 2006

(54) METHOD FOR CONTROLLING A SHIFTABLE CLUTCH IN THE DRIVE TRAIN OF A 4-WHEEL DRIVE MOTOR VEHICLE

(75) Inventor: Thomas Hopper, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/155,762

(22) Filed: Jun. 20, 2005

(65) Prior Publication Data

US 2005/0230172 A1 Oct. 20, 2005

Related U.S. Application Data

(63) Continuation of application No. PCT/EP03/14345, filed on Dec. 16, 2003.

(30) Foreign Application Priority Data

Dec. 20, 2002 (DE) .................. 102 60 196

(51) Int. Cl.
*F16D 11/04* (2006.01)
(52) U.S. Cl. ..................... 180/247; 701/89
(58) Field of Classification Search ............. 180/233, 180/247, 248; 701/69, 88, 89
See application file for complete search history.

(56) References Cited

U.S. PATENT DOCUMENTS

| | | | | |
|---|---|---|---|---|
| 4,825,368 A | * | 4/1989 | Itoh et al. ............... | 701/69 |
| 5,060,747 A | * | 10/1991 | Eto ........................ | 701/69 |
| 5,219,038 A | * | 6/1993 | Hamada et al. .......... | 180/248 |
| 5,461,568 A | | 10/1995 | Morita | |
| 5,492,194 A | * | 2/1996 | McGinn et al. .......... | 180/233 |
| 5,605,201 A | * | 2/1997 | McGinn et al. .......... | 180/233 |
| 5,752,211 A | * | 5/1998 | Takasaki et al. ......... | 701/69 |
| 5,809,443 A | * | 9/1998 | Perttunen et al. ........ | 701/69 |
| 5,927,425 A | * | 7/1999 | Kusano ................... | 180/248 |
| 5,979,584 A | * | 11/1999 | Glab et al. .............. | 180/249 |
| 6,047,231 A | * | 4/2000 | Rodrigues et al. ....... | 701/69 |
| 6,397,139 B1 | * | 5/2002 | Rodrigues et al. ....... | 701/89 |

FOREIGN PATENT DOCUMENTS

| | | |
|---|---|---|
| DE | 37 21 626 C2 | 1/1988 |
| DE | 197 06 720 A1 | 10/1997 |
| EP | 0 393 596 | 10/1990 |
| EP | 1 188 597 A2 | 3/2002 |

OTHER PUBLICATIONS

Article entitled Strategien zur Steuerung, Regelung und Überwachung der Kinematik mechatronischer Einzelantriebssysteme by Joachim Palmer, pp. 1–6.

* cited by examiner

*Primary Examiner*—Tony Winner
(74) *Attorney, Agent, or Firm*—Crowell & Moring LLP (57) ABSTRACT

A method of controlling a shiftable clutch in a drive train between a front axle and a rear axle of a motor vehicle with a four-wheel drive is provided. One axle is driven directly and the other axle, as a hang-on system, is coupled by way of the clutch. In order to create a method of controlling the shiftable clutch in a drive train between the front axle and the rear axle, and a corresponding system with an improved availability of the full four-wheel drive characteristic with a corresponding protection of the driving dynamics of the overall vehicle, the clutch is continuously acted upon by torque in an adjustable manner by way of a pilot control measure.

19 Claims, 3 Drawing Sheets

METHOD FOR CONTROLLING A SHIFTABLE CLUTCH IN THE DRIVE TRAIN OF A 4-WHEEL DRIVE MOTOR VEHICLE

CROSS-REFERENCE TO RELATED APPLICATIONS

This application is a continuation of PCT Application No. PCT/EP2003/014345 filed on Dec. 16, 2003, which claims priority to German Application No. 102 60 196.8 filed Dec. 20, 2002.

BACKGROUND AND SUMMARY OF THE INVENTION

The present invention relates to a method of controlling a shiftable clutch in a drive train between a front axle and a rear axle of a 4-wheel drive motor vehicle.

From the state of the art for all-wheel drive motor vehicles, it is known that, in one type of construction of all-wheel drive vehicles, one axle is permanently driven and the respective second axle is essentially hung onto this drive train, or is constructed as a so-called "hang-on" system. In a known application case, the rear axle is permanently driven and the front axle is connected as the hang-on system. For this purpose, the center differential in a drive train of the vehicle is replaced by a shiftable clutch by which the front axle can, here, be coupled to the rear axle.

In the control of the shiftably constructed clutch by the use of a control unit logic according to the state of the art, deviations of the tire periphery between the axles are not taken into account. If tire periphery deviations exist between the front axle and the rear axle, in the case of an all-wheel operation or in the case of a rigid coupling of the axle, the entire drive train will be distorted. The components, such as drive shafts, propeller shafts and differentials, will be subjected to a higher stress. Correspondingly, all participating components have to be designed for greater loads than would be the case within the scope of limit loads of a corresponding vehicle without the additional loads caused by tire periphery deviations. Furthermore, the tires will slip, which results in an increased abrasion and wear on their running surfaces.

An analogous situation occurs in the case of systems with a rear axle as a hang-on system. The relationships for insufficiently large diameters of the wheels at the front axle of a front axle hang-on system illustrated in the following with reference to an embodiment of the invention will then occur in the case of a rear axle hang-on arrangement when the rear axle is too small and vice versa. On the basis of these simple relationships between the two different hang-on systems, within the scope of the present disclosure, reference will only be made without any exclusion to a front-axle hang-on system.

In particular, a significant disadvantage of the prior art is that a distortion of the drive train with the exemplary disadvantages described above is accepted in a condoned manner by the construction of a rigid all-wheel drive. As an alternative, for example, according to the teaching of German Patent documents DE 37 21 626 C2 and DE 197 06 720 A1, the shiftable clutch is simply opened up to release a severe distortion in the drive train. Although in this manner any built-up distortion is compensated, the vehicle will then no longer have any all-wheel characteristics at least for the duration of this compensating operation. That means that, suddenly and in a manner that can almost not be predicted by the driver, in this condition, the vehicle acts only as a rear-wheel drive vehicle or as a front-wheel drive motor vehicle. Depending on the existing operating situation, this abruptly starting operation may have such a negative effect on the handling of a vehicle that, as a result, the vehicle may even become unstable.

It is an aspect of the present invention to create a method of controlling a shiftable clutch in a drive train between a front axle and a rear axle of a four-wheel drive motor vehicle, and to create a corresponding system with an improved availability of a full four-wheel drive characteristic with a corresponding reliability of the driving dynamics of the corresponding overall vehicle.

According to the invention, this aspect is achieved by providing systems and methods of controlling a shiftable clutch in a drive train between a front axle and a rear axle of a four-wheel drive motor vehicle. One axle is driven directly and the other axle, as a hang-on system, is coupled by way of the clutch. The clutch is continuously acted upon by torque in an adjustable manner by way of a pilot control measure. Advantageous further developments of the invention are described and claimed herein.

A method according to the invention is therefore characterized in that the clutch is always acted upon by a torque in an adjustable manner by way of a pilot control measure. With respect to its extent, this torque is adjustable on the shiftable clutch itself or, for example, on a controlling hydraulic device.

This invention is based on the recognition that, even in the case of wheel diameter deviations and resulting distortions in a drive train of an all-wheel-driven vehicle, a complete torque compensation is not required. Within the scope of a tire tolerance logic, a torque is therefore defined by which the drive train may in each case be distorted. In order to be able to display this torque, the clutch is appropriately controlled in the course of the tire tolerance logic. Thus, the clutch remains essentially always closed during the driving operation. Therefore, as a further development of the invention, while the advantageous characteristics of an all-wheel drive are fully utilized, the desired torque distribution within the drive train onto a front axle and a rear axle can always be implemented. In the normal usage during the drive, an opening of the clutch, particularly for the purpose of a torque compensation within a distorted drive train, is avoided. Correspondingly, a motor vehicle operated according to a method of the invention, in contrast to known vehicles, can be operated by the permanent influence of the shiftable clutch while clearly limiting the slip and other negative phenomena by means of an essentially permanently acting all-wheel drive and with a high vehicle stability.

If the front axle is too small, the latter runs in a drive train of the prior art according to a concept with a rigid coupling of the axles at small engine torques in a negative torque, as illustrated in the following as a thin solid line VA in FIG. 2 of the drawing. Analogously, if the rear axle is too small, a negative torque should be expected there, as indicated as a thin broken line ha in FIG. 3. The driving torque distribution becomes dependent on tire deviations and the engine torque, but more precisely on a respective Cardan torque, which considerably impairs the driving dynamics. An analogous situation exist when the rear axle is too small. In an appropriate suitable neutral driving condition, for example, in the case of an unbraked, unpowered drive without curves and without an intervention of a driving dynamics control or of a DCS control, by means of the wheel speeds or the rotational speed deviation, the tire deviations between the front and the rear axle are determined. In this embodiment, the clutch is therefore opened only for a short time for this purpose. In the form of the average wheel inequality between the axles, the system then learns the respective conditions to which an adapted control concept is applied with the goal of letting the hang-on system operate as a permanent all-wheel drive without any slip.

In an embodiment of the invention, the defining of the clutch torque as the pilot control takes place mainly by the accelerator pedal position. It is formed such that the vehicle moves close to the fully locked range; that is, in a good approximation, it exhibits the behavior of a rigid all-wheel drive. If wheel inequalities exist in this case, a distortion torque will occur, which is superimposed on the ideal course of the torques at the two axles, so that, without the intervention by a method according to the invention, cumulative courses will occur which partially have very disadvantageous effects. The tire tolerance logic intervenes here in that the pilot control is correspondingly reduced. What should be taken into account here is, on the one hand, the type of distortion condition and/or which axle has a smaller rolling circumference, and, on the other hand, the load condition which is a result of the preceding sign of the effective Cardan torque as a trailing or the driving node. If the front axle is too small in comparison to the rear axle, in the case of the drive mode, when the Cardan torque rises from zero, the pilot control is restricted to a tolerated distortion torque by the tire tolerance logic. For Cardan torques smaller than zero, that is, in the trailing case, the tire tolerance logic restricts the pilot control to a fraction of the Cardan torque. Thus, despite an existing tire circumference deviation, a desired optimal distribution of the trailing torque to the axles can be achieved. If the rear axle is too small, point-symmetrical reflected torque curves occur so that the control tasks only have to be exchanged between the drive and the trailing case. Corresponding to these situations of driving dynamics, the torque acting upon the clutch is defined under the influence of tire tolerance logic, as will be explained in detail in the following with reference to diagrams of a concrete embodiment of the invention with an advantageously continuous course of the curve.

In an advantageous further development of the invention, however, the tire tolerance logic actively intervenes only when the deviation between the front and rear axle leaves a dead or intervention-free zone which, according to a further development of the invention, is selected as a function of the speed.

In this case, the system synchronizes the axle speeds in that it couples the front axle and the rear axle with one another by way of the transfer case such that at least a joint average speed of the axles is set also in the case of tire deviations. According to the above-described characteristics in embodiments of the present invention, in the control of the clutch in the form of a control unit logic, tire circumference deviations between the axles corresponding to a tire tolerance logic are taken into account by the determination of a tolerable differential torque in the controllable clutch. In an embodiment of the invention, a measurement of the rotational speeds of the front and rear axle, in the neutral straight run and while the clutch is opened for a short time, is carried out as described above. In contrast to methods of the prior art, it is thereby ensured that the all-wheel characteristic is eliminated only outside a condition that could tend to lead to a form of instability of the vehicle handling or the like. In addition, this phase with a loss of the all-wheel characteristic lasts only for a very short time, and furthermore, after the wheel inequality has been learned in one travel segment, the measurement does not have to be repeated. On the basis of the average rotational speed differences between the front axle and the rear axle, an occurring distortion torque is defined in the event of an overly distorted or firmly closed clutch or a deviation of the wheel diameter.

A method of the above-described type is based on a consideration of the torque conditions occurring because of the determined wheel diameter deviations in the case of a normalized high coefficient of friction of the road base. In an alternative embodiment, a method according to the invention is further developed such that, in the case of this consideration, respective actual road and coefficient-of-friction conditions are taken into account.

According to the above-explained teaching, a distortion of the drive train as a result of tire circumference deviations between the front axle and the rear axle is limited or displaced by the tire tolerance logic in a meaningful range. However, the degree of a possible distortion depends on the tire circumference deviations and the respective actual coefficient-of-friction conditions. A tire tolerance logic of the former type improves the driving dynamics of an essentially permanently all-wheel-driven vehicle but does not adapt itself, among other things, to changing road conditions. The most serious case is always assumed here—thus summer tires on a base with a high coefficient of friction. This has a special effect on the determination of the characteristic Cardan torque, above which, when the front axle is too small, the pilot control is no longer limited in order to utilize the driving torque specifically at the front axle for the acceleration. In the case of low coefficients of friction, the limitation of the pilot control could be eliminated in the case of clearly lower Cardan torques because the drive train is not as distorted as at a high coefficient of friction.

The tire deviations of the individual wheels are required as the input quantities for the tire tolerance logic. In the case of the former measuring method, these are determined in suitable driving conditions during an unbraked and unpowered drive without cornering or a driving dynamics control intervention or the like by means of free wheel speeds while the clutch is open. This has the disadvantage that the clutch has to be opened for the determination. The opening of the clutch, in turn, has the direct result that in this condition the vehicle has a pure rear wheel drive. Furthermore, in the case of this method, the observability of the tire deviations in the normally endeavored all-wheel operation when the clutch is closed will be lost.

In order to completely eliminate these basic disadvantages, in the case of an alternative method under the same suitable driving conditions, which were indicated above as being unbraked, unpowered, as well as without a cornering influence and/or control intervention, rotational speed differences between the front axle and the rear axle are determined at special clutch torques. On the basis of two value pairs of this type, via extrapolation, average tire deviations between the front axle and the rear axle as well as a distortion torque, which occurs in the case of an overlocked condition of the clutch, can then be determined. The method will be described in detail in the following on the example of a 0.6% diameter deviation between the front axle and the rear axle with reference to a drawing.

In order to achieve a high precision when using this method, clutch torques used for the identification are selected to be of sizes which are as different as possible, so that they indicate a large support basis with very clear rotational speed differences between the front axle and the rear axle. On the other hand, there is no falling below a minimally required clutch torque and no exceeding of a distortion torque maximally tolerated in the drive train.

On the whole, the invention provides a possibility of representing a permanent all-wheel drive in all driving situations, thus particularly without openings of the shiftable clutch forced for the purpose of the compensation of a distortion condition. An opening of the clutch is also no longer required for the determination and/or monitoring of tire diameter deviations. In a preferred embodiment of the invention, the opening of the shiftable clutch can therefore be completely eliminated.

Thus, according to the invention, in the case of a vehicle with tire deviations between the front axle and the rear axle, a distortion of the drive train occurs which is limited and tolerated in any condition. As a result, its components, such as drive shafts, propeller shafts and differentials, are less stressed than in the case of a permanent all-wheel drive with a rigid axle coupling. This approach reduces the wear, prolongs the service life and lowers cost and weight because the dimensioning can take place correspondingly. A negative influence of an excessive distortion of the drive train on the steering and the vehicle handling, which is noticeable to the driver, is eliminated. Furthermore, the tire wear is minimized and simultaneously the lateral control potential of the vehicle is not reduced because no wheel slips are forced by an excessive distortion. In addition, as a result of this method, the drive distribution within the vehicle is influenced such that the driving dynamics are improved during the drive as well as during trailing.

Other objects, advantages and novel features of the present invention will become apparent from the following detailed description of the invention when considered in conjunction with the accompanying drawings.

DETAILED DESCRIPTION OF THE DRAWINGS

Figure 1:
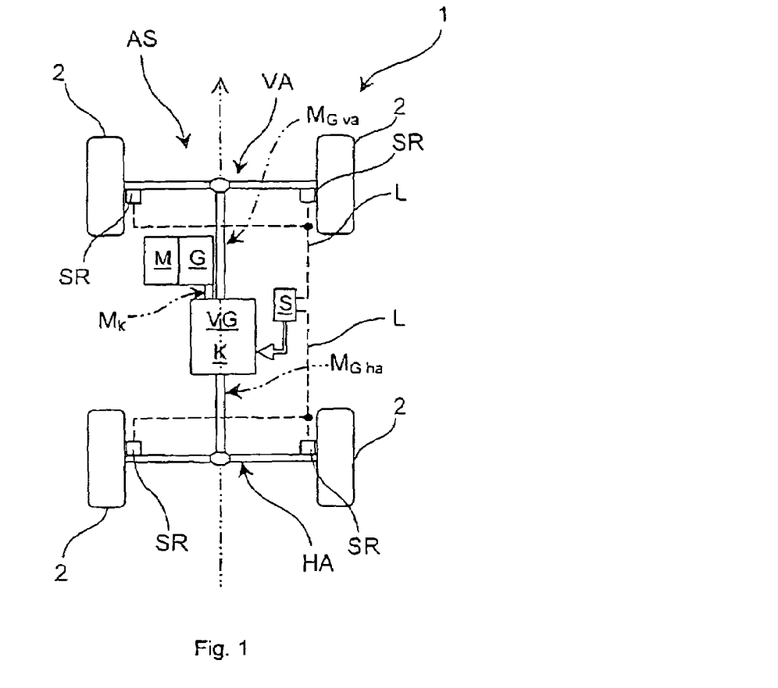
FIG. 1 is a schematic representation of a drive train of an all-wheel-drive vehicle.

FIG. 1 is a schematic view of a drive train AS of an all-wheel drive vehicle 1. In the case of the front-axle hang-on system considered here, a rear axle HA is driven by an engine transmission unit MG by way of a drive train AS. By means of a shiftable clutch K in a transfer case VG, a front axle VA is connected with the rear axle HA via the drive train AS. In this case, the clutch K is controlled by a control unit S. The control unit S is connected by way of lines L with rotational speed sensors SR at the wheels 2 of the front axle VA and the rear axle HA. From the engine transmission unit MG, a Cardan torque $M_K$ is transmitted to the shiftable clutch K which, in turn, divides it into the propeller shaft torques $M_{G\,va}$ of the front axle VA and $M_{G\,ha}$ of the rear axle HA. The manner of the control of the shiftable clutch K and the generating and evaluating of the respective sensor signals will be described in detail in the following.

Thus, in the case of all-wheel drive vehicles, an important disadvantage of the prior state of the art consists of the fact that, in the event of wheel tire diameter deviations between the front axle VA and the rear axle HA, distortions occur in the drive train AS. However, as a result of the uneven wearing of the wheel tires, for example, because of different weight distributions inside the vehicle 1, such wheel tire diameter deviations cannot be excluded during operation. Correspondingly, all elements of the drive train AS, such as propeller shafts and differentials, also have to be designed for significantly higher loads. A compensation for the essentially continuously building-up distortion of the drive train AS is provided to the entire driving system only by a slipping of the wheels 2 permanently occurring during the travelling operation. However, this process causes an increased wear in the area of the treads of the wheel tires 2.

Figure 2:
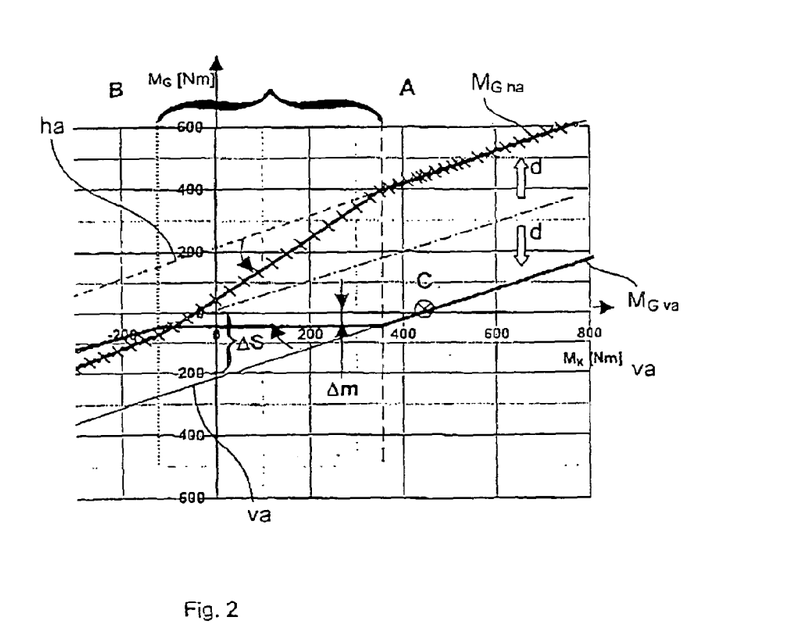
FIG. 2 is a diagram with a representation of the torques occurring according to a first embodiment of the invention when the front axle is too small.

FIG. 2 illustrates a diagram of the torques which, according to a first embodiment of the invention, occur when the front axle VA is too small. The diagram explains the physical relationships within the drive train AS as an example of a 0.8% deviation of the wheel diameters. In the following, the conditions without an intervention of a tire tolerance logic according to the invention are illustrated first. Subsequently, an influence of the tire tolerance logic as a meaningful alternative to abandoning the all-wheel drive, and as a delimitation to a rigidly coupled all-wheel drive, is shown, In the following, the tire tolerance logic will be understood as a method which is implemented in the correspondingly constructed control unit S of the all-wheel vehicle.

The thin lines va, ha each indicate the behavior or a torque course $M_G$ in the propeller shafts when a vehicle is overlooked or has an overlooked clutch K, which will act identical to a vehicle with a rigid all-wheel drive. As a result of a deviation of the wheel diameters, the torque courses ha for the rear axle HA as well as va for the front axle VA are equidistantly displaced along the arrows d by a certain amount with respect to a dash-dotted ideal curve. Provided that the coefficient-of-friction conditions between the road surface and the tread of the wheel tires 2 are the same, this displacement increases in the case of a greater wheel tire diameter deviation. As a result of the deviation of 0.8% between the front axle VA and the rear axle HA assumed here, there is, on the whole, a distortion torque $\Delta S$ of slightly more than 200 Nm in the drive train AS. The comparatively smaller, and therefore faster rotating, front axle VA is braked with this torque. Since the coupling by way of the road involves internal forces or torques, the rear axle HA is driven correspondingly.

In the illustrated diagram, the left half plane B characterizes a braking or trailing condition; the right half plane A characterizes a drive case. For small positive Cardan torques $M_K$, the front axle VA runs without a control intervention according to the invention and, when the clutch K is overlocked, on the basis of the distortion built up within the drive train AS, in a range of negative torques; see curve va. In contrast, the rear axle HA runs in the overincreased driving torque; see curve ha. Starting from a characteristic Cardan torque $M_K=C$, which here is at approximately +400 Nm, a driving torque is also transmitted from the front axle VA. The wheel slips occurring in this condition as a result of the tire tolerances Δr cause an increased wear at the wheel tires. In addition, they reduce the lateral control potential of the wheel tire and thereby exercise a negative influence on the driving dynamics of the motor vehicle.

In the case of a front axle which is too small in comparison to the rear axle as graphically illustrated in FIG. 2, in the drive case A, when the Cardan torque $M_K$ rises from zero, the pilot control is limited by the tire tolerance logic to a tolerated distortion torque $\Delta m$. This limitation is maintained until the so-called characteristic Cardan torque C is reached, starting from which also the front, axle torque $M_{G\ va}$ becomes permanently positive. For Cardan torques $M_K$ greater than the characteristic Cardan torque C, the limitation is canceled in order to be able to utilize the driving torque at the front axle. The tire tolerance logic according to the teaching of the present invention therefore reduces the pilot control of the clutch to the tolerated distortion torque $\Delta m$ to such an extent and, in the diagram of FIG. 2, viewed over rising Cardan torques for such a time that, a range around the characteristic Cardan torque $M_K = C$ has been reached. This section with a significant control intervention by way of the shiftable clutch K, which can be recognized by the courses of the propeller shaft torque curves $M_{G\ vs}$, $M_{G\ ha}$, is indicated by a bracket in FIG. 2. Thus, for example, the propeller shaft torque $M_{G\ va}$ of the front axle VA in the case of a load change, in the course of the controlled intervention of the clutch K, is limited from a negative torque of approximately −200 Nm to a value $\Delta m$ of here approximately −50 Nm. To the same extent, at this point, which is critical for the directional control, the propeller shaft torque $M_{G\ ha}$ of the rear axle Ha is also limited by a positive torque of approximately 200 Nm to approximately 50 Nm. With respect to its size, the clutch torque is selected with its minimum value such that the clutch K remains in contact, and thus virtually immediately each torque can be set by way of the clutch K. Therefore, the full all-wheel performance is ensured without the vehicle distorting during the constant travel beyond a defined range.

In this case, a respective traction demand by the driver is sensed by way of the gradients of the accelerator pedal position or by way of an accelerator pedal interpreter. If the gradient, and thus an acceleration, desired by the driver exceeds a defined threshold, a change-over takes place to the pilot control for the same tire circumferences fitting this situation, or the restriction by the tire tolerance logic is canceled and the clutch K is overlocked. The return to the restriction does not take place abruptly but in a time-delayed manner, which is implemented here by a low-pass behavior of the system. As a result of this method, the clutch K is closed in the case of traction before a slip can occur.

Above the characteristic Cardan torque $M_K=C$, the pilot control is no longer limited in order to fully utilize the driving torque at the front axle VA. The relationships are illustrated by the courses of the propeller shaft torque curves $M_{G\ va}$, $M_{G\ ha}$ shown by thick lines in FIG. 2 in comparison to lines va, ha and deviating on the other side of the range above the characteristic Cardan torque $M_K=C$ under the influence of the tire tolerance logic from the pertaining thin lines.

In an engine trailing case, as seen in the left half plane B of the diagram of FIG. 2, the vehicle without the intervention of a tire tolerance logic shows the behavior characterized by the thin lines ha, va: The rear axle HA runs with a clearly positive torque and, considered alone, would therefore still accelerate the vehicle. Only the front axle VA already runs in a negative torque, whereby the vehicle would be braked by the front axle.

For Cardan torques smaller than zero, that is, in the trailing case B, the tire tolerance logic limits the pilot control to a fraction x of the cardan torque $M_K$. Thus, despite an existing tire circumference deviation, a desired optimal distribution of the trailing torque to the axles VA, HA can be achieved. In the present case, this fraction x amounts to approximately 40%. The trailing torque offset at the front axle VA is correspondingly limited, whereby, because of the torque balance at the transfer case VG, the rear axle HA is also pulled in the trailing condition. However, in this case, the clutch torque does not become smaller than the tolerated distortion torque $\Delta m$ in order to achieve a continuous transition of ranges A and B. In this manner, a harmonic load change behavior of the vehicle equipped with this control is achieved. The torque course $M_{G\ VA}$ thereby occurs at the front axle VA, and corresponding to the torque balance at the transfer case VG, $M_K = M_{G\ VA} + M_{G\ HA}$, the torque course $M_{G\ HA}$ occurs at the rear axle HA.

Figure 3:
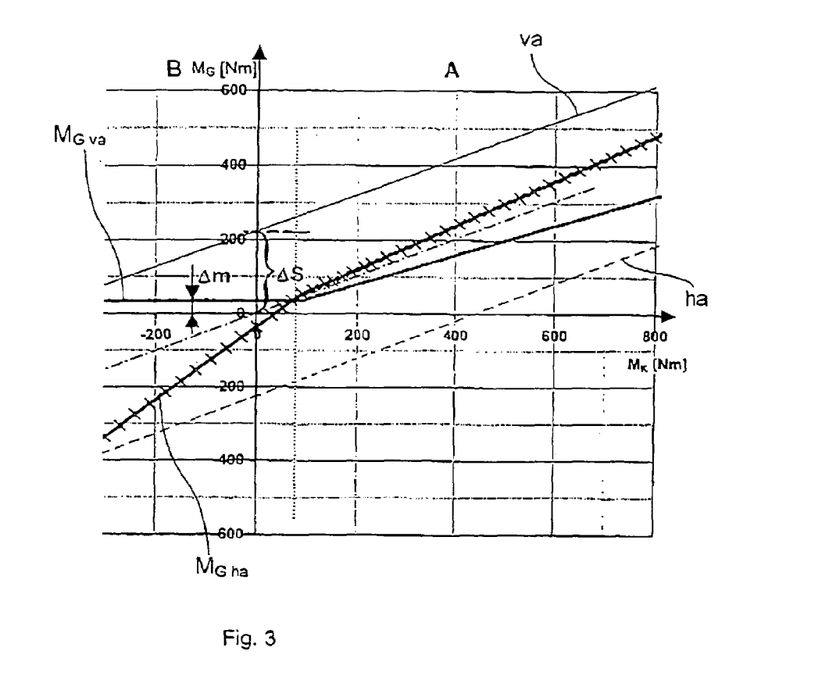
FIG. 3 is a diagram with a representation of the torques occurring according to a second embodiment of the invention in the drive train if the rear axle is too small in comparison to the front axle.

In the form of another diagram analogous to that of FIG. 2, FIG. 3 illustrates the propeller shaft torques $M_G$ which occur in the drive train AS when the rear axle HA is too small with respect to the front axle VA. The diagram again shows a deviation of the wheel diameters of 0.8% as an example. Also here, the resulting distortion torque of the drive train AS is correspondingly at approximately 200 Nm. The effect on the axles HA, VA is inverted. The small rear axle HA, which therefore rotates faster than the front axle VA, is now braked. In contrast, the front axle VA is driven. The diagrams of FIGS. 2 and 3 therefore act essentially like point-symmetrical mirror images of one another.

In the case of a rear axle which is too small, the tire tolerance logic limits the pilot control for Cardan torques $M_K$ greater than zero, thus in the drive case A, in that the drive torque going to the front axle VA is defined to be a fraction x of the Cardan torque $M_K$. Corresponding to the torque balance at the transfer case VG, the rear axle HA thus also sets off a driving torque, as indicated by the thick lines $M_{G\ ha}$. The driving torque distribution is defined by the selection of the parameter x, which here again amounts to approximately 40%. Correspondingly, an optimal drive distribution is defined, here also, a minimal clutch torque $\Delta m$ of 50 Nm being achieved for a continuous transition between drive A and trailing case B.

In the engine traction case B, the clutch torque in the range $M_K=0$ is limited by the control to a value $\Delta m$ of approximately 50 Nm in order to reduce the trailing torque at the rear axle HA. This results in the torque course $M_{G\ VA}$ at the front axle and in the torque course $M_{G\ HA}$ at the rear axle HA corresponding to the torque balance at the transfer case VG. In cooperation with an engine traction torque control, a harmonic load change behavior is again obtained.

Figure 4:
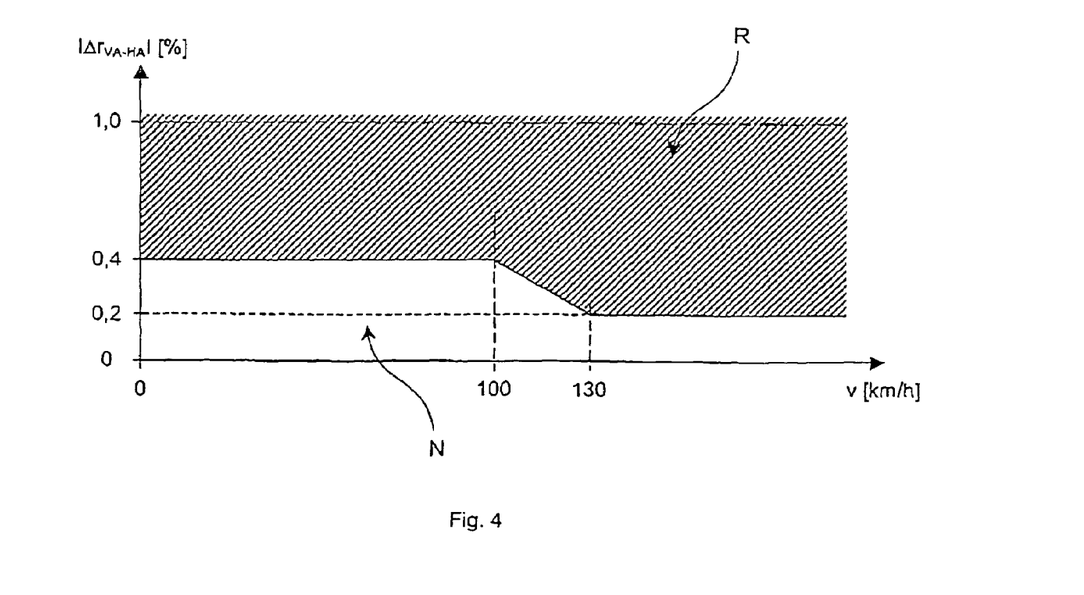
FIG. 4 is a diagram representing a speed dependence of an intervention-free and a control-requiring range.

The influence of the distortion torques always building up in the drive train AS in the case of wheel diameter deviations is a function of the speed of the vehicle. Thus, at a speed v=0, there is hardly any reason for a controlling intervention; whereas, at a speed of v=100 km/h, for protecting the driving dynamics, an intervention of a tire tolerance logic according to the invention may already be meaningful. Furthermore, in the case of large deviations of the wheel diameters or the radius difference $\Delta r$ of the wheels 2 at the front and rear axle, a control intervention is more necessary than in the case of small deviations. FIG. 4 shows a relationship between the radius difference $\Delta r$ over the speed v, as an example. Since, as illustrated by the diagrams of FIGS. 2 and 3, the situations in the case of front axle wheels which are comparatively too small and rear axle wheels which are comparatively too small act in a mutually mirror-inverted manner, only the amount of a radius difference $\Delta r$ between the wheels 2 of the front axle VA and rear axle HA is considered. When the average radius difference $\Delta r$ leaves a speed-dependent dead or control-free zone N, the tire tolerance logic becomes active as a limit of the pilot control, as indicated by a range R. Thus, if at a speed of v=100 km/h and a radius difference Δr of 0.3, no control is carried out, wherein at a speed of v=130 km/h and the same radius difference Δr, the tire tolerance logic will already be active.

In an above-described first formulation of a tire tolerance logic, the free-rolling wheels 2 of the front axle VA and the rear axle HA are examined in order to determine respective average wheel diameter deviations between the axles. Therefore, for this measurement, the clutch K necessarily has to be completely opened at least for the short measuring time. During this measuring time, no all-wheel characteristic for the drive is available and a completely open clutch having a prolonged reaction or response time during the closing.

However, an actually occurring distortion, in addition to an average wheel diameter deviation, is very significantly dependent on the coefficient of friction μ of the respectively current base and the characteristics of the wheel tires. A pilot control of the type of the above-described tire tolerance logic does not adapt itself to changing road conditions. The most serious case is always assumed here: summer tires on a high-friction base. This has a special effect on the determination of the characteristic Cardan torque C, above which, when the front axle VA is too small, the pilot control is no longer limited in order to utilize the driving torque at the front axle VA. In the case of low coefficients of friction, the limitation of the pilot control could be eliminated in the case of clearly lower Cardan torques because the drive train is not as distorted as at a high coefficient of friction.

The tire deviations of the individual wheels are required as the input quantities for the tire tolerance logic. In the case of the former measuring method, these are determined in suitable driving conditions during an unbraked and unpowered drive without cornering or a driving dynamics control intervention, by means of free wheel speeds while the clutch is open. This has the disadvantage that the clutch has to be opened for the determination. The opening of the clutch, in turn, has the direct result that in this condition the vehicle has a pure rear wheel drive. Furthermore, in the case of this method, the observability of the tire deviations in the normally endeavored all-wheel operation when the clutch is closed will be lost.

Figure 5:
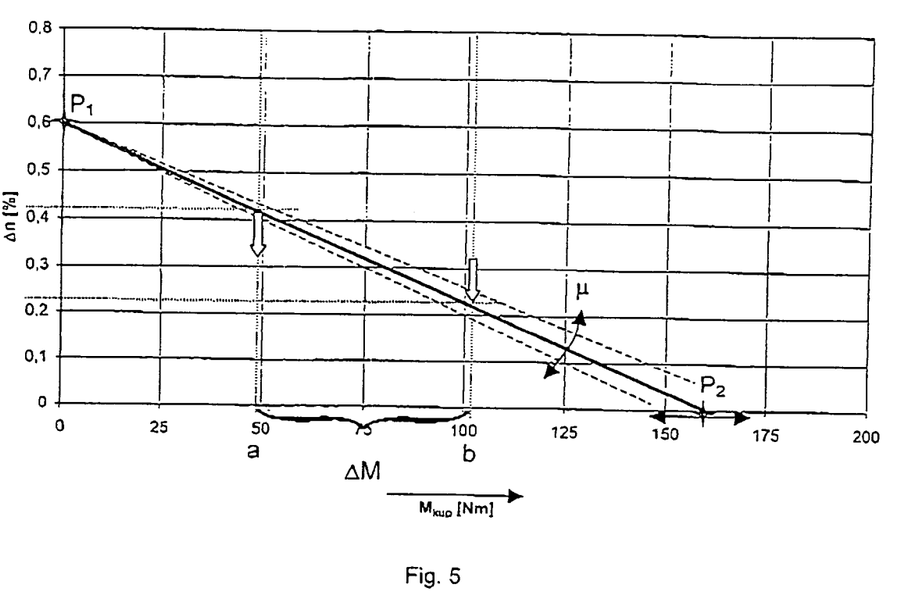
FIG. 5 is a diagram representing a method for the coefficient-of-friction-dependent determination of a rotational speed difference between a front and a rear axle as a function of the respective clutch torque.

In order to completely eliminate these basic disadvantages, in the case of an alternative method under the same suitable driving conditions, which were indicated above as being unbraked, unpowered as well as without a cornering influence and/or control intervention, coefficient-of-friction-dependent rotational speed differences between the front axle and the rear axle are determined at special clutch torques. FIG. 5 illustrates this method on the example of a 0.6% diameter deviation between the wheels of the front and rear axles: for preset values of the clutch torque $M_{kup}$, value pairs are formed of the clutch torque $M_{kup}$ and the rotational speed deviation Δn. The rotational speed difference between the front and rear axle VA, HA is a linear function of the clutch torque. Between two such value pairs of measuring points a, b of the clutch torque $M_{kup}$, therefore, as a result of a linear extrapolation in $P_1$—the ordinate section—, the tire deviation Δr between the front axle VA and the rear axle HA can be determined, and in $P_2$—the intersection with the abscissa—, a distortion torque can be determined which would occur in an overlooked condition of the clutch K in the drive train AS.

Point $P_1$ is fixed as the value in the normal case; that is, without an excessive wear of the wheel tires and/or loss of pressure. In contrast, the value $P_2$ is a function of the respective current coefficient of friction μ, as illustrated in FIG. 5. When the clutch is open—$M_{kup}$=0 Nm—, the rotational speed difference between the front axle VA and the rear axle HA occurs corresponding to the tire deviations Δr, or the deviation Δr between the front axle VA and rear axle HA can be derived from the rotational speed difference Δn. Δr is determined purely geometrically and is, therefore, not dependent on the coefficient of friction. The wear of the tires progresses very slowly so that this quantity exhibits a correspondingly sluggish behavior if no pressure loss occurs at the tire, If the clutch torque $M_{kup}$ is increased, the rotational speed difference Δn diminishes. The axles are increasingly synchronized. Starting at a special clutch torque $M_{kup}$, which corresponds to the maximal distortion torque $\Delta S_{max}$ and, here, is at approximately 160 Nm, the rotational speed difference Δn is zero and the intersection point $P_2$ with the abscissa is reached. This is the transition from the partially locked to the overlooked condition of the clutch K The maximal distortion torque or the distortion torque for the overlooked condition $\Delta S_{max}$ is a function of the extent of the deviation between the front axle VA and the rear axle HA, the axle loads, as well as the tire characteristics and the current coefficients of friction. The axle loads are sufficiently precisely known on the basis of the vehicle geometry and the longitudinal acceleration, so that tire characteristics and coefficients of friction, that is, the wheel slip courses, are to be considered as the essential and unknown influences.

The position of the intersection point $P_2$ with the abscissa is displaced from the position illustrated as an example toward the left under winter road conditions; toward the right to significantly higher μ values under dry summer road conditions and with summer tires of the vehicle. The parallel displacement of the torque courses ha, va illustrated by the two arrows d in FIGS. 2 and 3 also changes correspondingly: under winter conditions with a snow-covered road, these curves are closer to one another; in contrast, the distance d is larger under summer conditions. Correspondingly, the characteristic Cardan torque $M_K$=C shifts in the case of a distortion of the drive train AS, which increases in the summer and decreases with respect to the latter in the winter. When this characteristic Cardan torque $M_K$=C is exceeded, the controlling intervention in the pilot control can be terminated and, if required, the clutch K can be fully locked.

By setting two different clutch torques and the determination of the respective rotational speed differences in a suitable driving situation, the above-described relationships are determined. The deviation Δr, as well as the distortion torque $\Delta S_{max}$, can be determined by a linear extrapolation.

In order to achieve a high precision when using this method, clutch torques $M_{kup}$ used for the identification are selected to be of sizes which are as different as possible, so that they indicate a large support basis ΔM with very clear rotational speed differences Δn between the front axle VA and the rear axle HA. On the other hand, there is no falling below a minimally required clutch torque Δm. In the case of this minimally required clutch torque Δm of approximately 50 Nm, the plates within the clutch still rest against one another far enough that extremely short reaction or response times for shifting arbitrary torques by the clutch can be implemented. Furthermore, when point b is selected, a distortion torque maximally tolerated in the drive train AS is also not exceeded. Thus, a range of possible clutch torques $M_{kup}$ for an identification algorithm is obtained, or the minimally required clutch torque and the maximally tolerated distortion torque and, thus, the maximal clutch torque, are selected from this range.

The determination of the deviation Δr between the front axle VA and the rear axle HA therefore can advantageously be carried out in the partially locked condition. It can even still be observed and monitored in the partially locked condition. For this purpose, the clutch K no longer has to be opened, which considerably increases the availability of the all-wheel drive on a correspondingly equipped vehicle. A change of the deviation Δr between the front axle VA and the rear axle HA, for example, as a result of a pressure loss at the tire or of tire wear, can be virtually continuously detected in the particular driving situation without opening the clutch. The tire tolerance logic adapts itself correspondingly.

From the knowledge of the distortion torque $\Delta S_{max}$, the characteristic Cardan torque C can be derived, above which, in the case where the rear axle VA is too small, the pilot control is no longer limited. As a result, at low coefficients of friction, the limitation of the pilot control can be canceled at clearly smaller Cardan torques. The tire tolerance logic adapts itself, for example, to winter road conditions. The pilot control is not reduced to the same extent as to the high coefficient of friction, but adapts itself to the tire characteristics and the prevailing coefficients of friction; that is, to the corresponding slip courses. This leads to an optimization of the system function.

The tire longitudinal stiffness k can be determined with rood precision from the distortion torque $\Delta S_{max}$ of the deviation Δr and the axle loads, which are known. This tire longitudinal stiffness k, according to $\mu = k*s$, represents the linear range of the wheel slip curve or indicates the coefficient of friction between the tire and the road. This information is the basis of all additional analytical considerations, such as the calculation of the front axle torque, the blind moment, etc.

During a cornering of the vehicle, the front axle VA, as a rule, rotates faster than the rear axle HA on the basis of the so-called Ackermann effect. By analogy, this condition is applied to a drive with wheel tires at the front axle VA which are too small, and is treated by the tire tolerance logic correspondingly for the extensive inhibition of the drive train AS also during cornering. In this case, when leaving the dead zone, according to the illustration of FIG. 4, a respectively tolerated distortion torque Am is defined by a suitable steering-angle-dependent characteristic curve.

Thus, by using a method according to the invention, the drive distribution is influenced such that the driving dynamics are improved in the permanent all-wheel drive with respect to the drive as well as to the trailing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers

| | |
|---|---|
| 1 | all-wheel driven vehicle |
| 2 | wheel |
| HA | rear axle |
| MG | engine transmission unit |
| AS | drive train |
| VG | transfer case |
| K | shiftable clutch as part of the transfer case VG |
| VA | front axle |
| S | control unit |
| L | lines |
| SR | rotational speed sensor |
| $M_K$ | Cardan torque |
| $M_C$ | torque course in the propeller shafts |
| $M_{G\,va}$ | propeller shaft torque of the front axle VA |
| $M_{G\,ha}$ | propeller shaft torque of the rear axle HA |
| A | trailing case |
| B | driving case |
| ha | torque course for the rear axle HA |
| va | torque course for the front axle VA |
| ΔS | distortion torque |
| C | characteristic Cardan torque |
| ☐m | clutch torque reduced to a tolerated distortion torque |
| x | defined torque distribution between VA and HA |
| MSR | engine traction torque control |
| R | range with control intervention |
| N | range without control intervention/dead zone |
| v | speed |
| Δr | radius deviation of the wheels at the front and rear axle |
| Δn | rotational speed deviation |
| $M_{kup}$ | clutch torque |
| a | testing or adjusting value of the clutch torque $M_k$ |
| b | testing or adjusting value of the clutch torque $M_k$ |
| $P_1$ | measuring point |
| $P_2$ | measuring point |

What is claimed is:

1. A method of controlling a shiftable clutch in a drive train between a front axle and a rear axle of a four-wheel drive motor vehicle, the method comprising the acts of:
   driving one axle directly;
   driving the other axle coupled as a hang-on system by way of the shiftable clutch;
   continuously acting upon the shiftable clutch with torque in an adjustable manner by way of a pilot control measure;
   determining values for an inequality of wheel tires between the front and the rear axles using a tire tolerance logic;
   determining a distortion of the drive train based on the determined values, wherein values of the wheel tire inequality between the front axle and the rear axle is measured in a form of a tire diameter deviation and,
   wherein determining the tire diameter deviation, comprises the acts of
   opening, in a neutral driving condition, the shiftable clutch; and
   determining a rotational speed difference between the front axle and the rear axle when the clutch is opened.

2. The method according to claim 1, further comprising the act of determining tire diameter deviations, without opening the shiftable clutch, by determining a rotational speed deviation between the front axle and the rear axle while the clutch is partially tensioned.

3. The method according to claim 1, wherein for determining the tire diameter deviation, measurements are carried out at two points.

4. The method according to claim 3, wherein by using the measurements carried out at two points, values at limits of Δn=0 and M=0 are determined via linear interpolation, wherein Δn is a speed difference between the front axle and the rear axle, and M is clutch torque.

5. The method according to claim 3, wherein the measurements carried out at two points utilized torque values of the shiftable clutch which are as far apart as possible.

6. The method according to according to claim 1, wherein by using the measurements carried out at two points, values at limits of Δn=0 and M=0 are determined via linear interpolation, wherein Δn is a speed difference between the front axle and the rear axle, and M is clutch torque.

7. The method according to claim 1, wherein the pilot control measure, via the tire tolerance logic, actively intervenes only when the distortion between the front axle and the rear axle leaves a dead or intervention-free zone.

8. The method according to claim 7, wherein the intervention-free zone is selected as a function of a respective speed of the vehicle.

9. The method according to claim 1, wherein a range about a characteristic Cardan torque is determined above which, when the front axle is too small, the pilot control measure no longer limits the clutch in order to utilize driving torque at the front axle for accelerating the vehicle.

10. The method according to claim 1, wherein the act of continuously acting upon the clutch occurs on a basis of a defined torque distribution between the front axle and the rear axle.

11. The method according to claim 10, wherein the defined torque distribution between the front axle and the rear axle within the drive train is implemented in certain ranges of driving dynamics, including when the front axle is too small in a trailing case and/or when the rear axle is too small in a drive case.

12. A method of controlling a shiftable clutch in a drive train between a front axle and a rear axle of a four-wheel drive motor vehicle, the method comprising the acts of:
   driving one axle directly;
   driving the other axle coupled as a hang-on system by way of the shiftable clutch;
   continuously acting upon the shiftable clutch with torque in an adjustable manner by way of a pilot control measure;
   determining values for an inequality of wheel tires between the front and the rear axles using a tire tolerance logic;
   determining a distortion of the drive train based on the determined values, wherein values of the wheel tire inequality between the front axle and the rear axle is measured in a form of a tire diameter deviation and,
   determining tire diameter deviations, without opening the shiftable clutch, by determining a rotational speed deviation between the front axle and the rear axle while the clutch is partially tensioned.

13. The method according to claim 12, wherein for determining the tire diameter deviation, measurements are carried out at two points.

14. The method according to claim 12, wherein by using the measurements carried out at two points, values at limits of Δn=0 and M=0 are determined via linear interpolation, wherein Δn is a speed difference between the front axle and the rear axle, and M is clutch torque.

15. A method of controlling a shiftable clutch in a drive train between a front axle and a rear axle of a four-wheel drive motor vehicle, the method comprising the acts of:
   driving one axle directly;
   driving the other axle coupled as a hang-on system by way of the shiftable clutch;
   continuously acting upon the shiftable clutch with torque in an adjustable manner by way of a pilot control measure;
   determining values for an inequality of wheel tires between the front and the rear axles using a tire tolerance logic;
   determining a distortion of the drive train based on the determined values, wherein the pilot control measure, via the tire tolerance logic, actively intervenes only when the distortion between the front axle and the rear axle leaves a dead or intervention-free zone, and, wherein, during cornering by the vehicle, when leaving the dead zone, a respectively tolerated distortion torque is defined by a suitable steering-angle-dependent characteristic curve for the vehicle.

16. A vehicle system, the system comprising:
   a front axle;
   a rear axle;
   a shiftable clutch arranged in a drive train between the front axle and the rear axle of the four-wheel drive vehicle;
   wherein one axle is driven directly and the other axle is coupled by way of the shiftable clutch as a hang-on system; and
   a control unit operatively coupled to continuously and adjustably act upon the clutch with torque based upon a tire diameter deviation determined by a rotational speed difference between the front axle and the rear axle when the clutch is opened in a neutral drivina condition.

17. The system according to claim 16, further comprising:
   rotational speed sensors operatively coupled with wheels of the front axle and the rear axle; and
   wherein the rotational speed sensors provide inputs to the control unit.

18. The system according to claim 17, further comprising:
   a transfer case, wherein the clutch is part of the transfer case.

19. The system according to claim 16, wherein the adjustment of the clutch is based upon a tire tolerance logic.

* * * * *